US006677590B2

(12) United States Patent
Nakauchi et al.

(10) Patent No.: US 6,677,590 B2
(45) Date of Patent: Jan. 13, 2004

(54) FLAME SENSOR

(75) Inventors: Shunsaku Nakauchi, Mitaka (JP); Masanori Hirasawa, Tokorozawa (JP)

(73) Assignee: Kokusai Gijutsu Kaihatsu Kabushiki, Tokyo (JP)

( * ) Notice: Subject to any disclaimer, the term of this patent is extended or adjusted under 35 U.S.C. 154(b) by 164 days.

(21) Appl. No.: 09/947,594

(22) Filed: Sep. 6, 2001

(65) Prior Publication Data

US 2003/0042420 A1 Mar. 6, 2003

(51) Int. Cl.[7] .................................................. G01J 5/02
(52) U.S. Cl. ............................. 250/339.15; 250/339.14
(58) Field of Search ....................... 250/339.15, 339.14, 250/339.05, 342, 338.1, 554; 340/578

(56) References Cited

U.S. PATENT DOCUMENTS

| | | | | |
|---|---|---|---|---|
| 5,352,352 A | * 10/1994 | Tsukada et al. | ............. | 204/415 |
| 5,420,426 A | * 5/1995 | Inoue | ...................... | 250/338.3 |
| 6,064,064 A | * 5/2000 | Castleman | ............. | 250/339.15 |
| 6,150,659 A | * 11/2000 | Baliga et al. | .......... | 250/339.15 |
| 6,239,435 B1 | * 5/2001 | Castleman | ............. | 250/339.15 |
| 6,373,393 B1 | * 4/2002 | Matsukuma et al. | ........ | 340/578 |
| 6,518,574 B1 | * 2/2003 | Castleman | ............. | 250/339.15 |

FOREIGN PATENT DOCUMENTS

| | | |
|---|---|---|
| JP | 59-198459 | 9/1984 |
| JP | 03-113711 | 4/1991 |
| JP | 09-170897 | 5/1997 |
| JP | 11-017539 | 1/1999 |
| JP | 11-134-141 | 5/1999 |

* cited by examiner

*Primary Examiner*—Constantine Hannaher
*Assistant Examiner*—Otilia Gabor
(74) *Attorney, Agent, or Firm*—Harness, Dickey & Pierce, P.L.C.

(57) ABSTRACT

A flame sensor capable of being easily produced and accurately detecting a flame includes a broadband filter having a transmission band inclusive of a line spectrum of resonance radiation of a carbonic acid gas, a narrowband filter permitting the passage of only the line spectrum of the resonance radiation of the carbonic acid gas and having its band center not coincident with that of the broadband filter, a light reception device, amplifiers, a circuit for computing the difference of mean intensities of spectrums transmitting through the filters and passing through the amplifiers, and a circuit for raising an alarm when the output of the computation circuit exceeds a predetermined value.

21 Claims, 12 Drawing Sheets

FLAME SENSOR

BACKGROUND OF THE INVENTION

1. Field of the Invention

This invention generally relates to a flame sensor. More particularly, this invention relates to a flame sensor capable of detecting a flame in places where solar rays and artificial rays of light are present without being affected by such rays of light.

2. Description of the Related Art

To detect a flame, there is a convenient method that detects resonance radiation generated by a high-temperature carbonic acid gas contained in the flame, as is well known in the art. A line spectrum of resonance radiation of the carbonic acid gas includes many wavelengths. To discriminate the line spectrum from ordinary artificial illumination and solar rays, it is appropriate to utilize a spectral line within the range of the infrared region or the ultraviolet region for detecting the flame.

Optical components belonging to both these regions do not much exist in artificial rays of light such as illumination, so disturbance by external light when sensing a flame is less in these regions.

To detect a flame in the presence of solar rays, a conventional method detects the line spectrum due to resonance radiation of the carbonic acid gas generated by the flame. To discriminate a continuous spectrum, such as solar rays and artificial light, from the line spectrum of the flame, this method compares and computes a plurality of outputs obtained from a monochromatic filter having a narrow-band that permits the passage of only the line spectrum of the flame and from monochromatic filters of a plurality of narrow-bands, which permit the passage of rays of light having one or a plurality of wavelengths, and the method discriminates whether light is the line spectrum of the flame or the continuous spectrum of the solar rays.

Another method utilizes flicker of light generated by the flame and detects the occurrence of the flame.

Among conventional methods that utilize resonance radiation of the carbonic acid gas, the method using the filter requires at least three monochromatic filters to achieve a flame sensor providing a small number of erroneous detections and capable of reliably sensing a flame. In addition, a computation circuit for sensing is complicated, and the flame sensor is unavoidably expensive.

Flame sensors using two or less filters involve the problem that the number of erroneous detections is great. Though economical, flame sensors utilizing the flicker of the flame also involve the problem that the number of erroneous detections is great. Therefore, the applicant of the present application has already proposed a flame sensor capable of reliably detecting a flame with equivalent certainty to the conventional flame sensors using three filters, and a flame sensor using three filters but using a simple computation circuit.

Solar rays, artificial rays or radiation from a stove emit not only visible rays, but also radiation in the infrared regions. However, this radiation is a continuous spectrum. In contrast, the spectrum of resonance radiation of the carbonic acid gas generated by the flame is a line spectrum in which energy concentrates in extremely narrow regions. Therefore, the technology described above utilizes the difference between the continuous spectrum and line spectrum for detecting the flame.

This technology, shown in FIG. 11, uses a broadband filter for permitting the passage of light of a band (W10) broader than a spectral line(W20) of resonance radiation of the carbonic acid gas generated by the flame and a narrow-band filter for permitting the passage of only the spectral line of resonance radiation of the carbonic acid gas, and has the band center of the broadband filter in alignment with that of the narrow-band filter. Intensity (optical energy) of light from the flame passing through these two filters is divided by the bandwidth of each filter to determine mean intensities.

When the intensity of the spectrum of light passing through the filters is a straight line-like continuous spectrum, energy of the rays of light passing through the two filters is proportional to the transmission bandwidth. Therefore, the mean intensities obtained by dividing this energy by the bandwidth are equal for the two filters.

However, when the rays of light passing through the filters are the line spectrum of resonance radiation of the carbonic acid gas, both of these two filters allow this line spectrum to pass therethrough and transmission energy is substantially equal. However, optical energy of the light passing through the broadband filter is divided by a greater bandwidth to calculate the mean intensity, whereas optical energy of the light passing through the narrow-band filter is divided by a smaller bandwidth. Consequently, a difference develops between these two mean intensities.

Therefore, the flame can be detected by judging whether or not a difference between the two mean intensities exceeds a threshold value.

In the technology described above, however, the band center of the broadband filter and the band center of the narrowband filter are in alignment with each other. Therefore, when the straight line-like continuous spectrum passes through the filters, the difference of the mean intensities is 0. To discriminate the straight line-like continuous spectrum from other spectra, the threshold value must be set to a small value near 0. However, it is difficult, from the aspect of production, to have the band center of the broadband filter in alignment with the band center of the narrowband filter. If the band centers of these two filters are not coincident, the difference of the mean intensities will not become 0 even when the straight line-like spectrum passes, resulting in inviting the occurrence of erroneous detections.

The explanation given above holds also true of the case where a first filter for allowing the passage of only light of the spectral line of the resonance radiation of the carbonic acid gas generated by the flame and a second filter for allowing the passage of light of a broader band than the spectral line are employed, the second filter being disposed in such a way that its band center is coincident with that of the spectral line, and the quantities of energy passing through these two filters is subtracted to detect a flame.

SUMMARY OF THE INVENTION

To solve the problems described above, the present invention aims to provide a flame sensor that can be easily produced and can accurately detect a flame.

A first aspect for accomplishing the objects described above provides a flame sensor that comprises a narrowband filter which passes only light of a band corresponding to a line spectrum of carbonic acid gas resonance radiation generated by a flame; a broadband filter which passes light of a band broader than the band corresponding to the line spectrum, and which has a band center different from a band center of the band corresponding to the line spectrum; a first light reception device which converts light passing through the narrowband filter to an electric signal; and a second light reception device which converts light passing through the broadband filter to an electric signal.

When the spectrum of the light passing through the filter is the continuous spectrum, energy of the rays of light passing through the two filters, the broadband filter and the narrow-band filter, is substantially proportional to the transmission bandwidth. Therefore, a difference between the mean intensities obtained by dividing this energy by each bandwidth is less than a predetermined value. The source of the difference between the mean intensities include the shape of the intensity distribution of the spectrum of rays of light passing through the filters and the distance between the band centers of the two filters.

In contrast, when only rays of light of a flame are present, the spectrum passing through the broadband filter and the narrow-band filter is mainly only the spectral line because the spectrum of the flame is the line spectrum, and energies passing through the broadband filter and the narrow-band filter are substantially equal to each other. Therefore, a mean intensity obtained by dividing energy of the spectrum passing through the broadband filter by the transmission bandwidth thereof is smaller than a mean intensity obtained by dividing energy of the spectrum passing through the narrow-band filter by the transmission bandwidth.

Therefore, a flame can be detected by judging whether a difference between the mean intensities of the electric signals in the transmission band of the narrow-band filter and in the transmission band of the broadband filter, that is, the difference obtained by subtracting the mean intensity of the rays of light passing through the broadband filter from the mean intensity of the rays of light passing through the narrow-band filter, exceeds a predetermined value. Detection of the flame can be achieved by providing a judging device for judging whether or not the difference between the mean intensities of the electric signals exceeds a predetermined value. A digital circuit including a differential amplifier or a CPU can compute this difference between the mean intensities.

A second aspect of the invention provides a flame sensor that comprises a first filter having a predetermined band for passing light, and having, within the predetermined band, a band blocking light of a band corresponding to a line spectrum of carbonic acid gas resonance radiation generated by a flame; a second filter having a band substantially the same as the predetermined band, passing light of a band inclusive of the band corresponding to the line spectrum, and having a band center different from a band center of the band corresponding to the line spectrum; a first light reception device which converts light passing through the first filter to an electric signal; and a second light reception device which converts light passing through the second filter to an electric signal.

When a spectrum of light passing through the filters is a continuous spectrum, energy of the light passing through the two filters is substantially proportional to the transmission bandwidth. When the spectrum is a line spectrum, energy passing through the two filters is substantially equal. Therefore, a flame can be detected by judging whether or not a difference between mean intensity of a signal obtained by subtracting an electric signal converted by the first light reception device from an electric signal converted by the second light reception device, that is, a difference obtained by subtracting the mean intensity of the electric signal converted by the first light reception device from the mean intensity, exceeds a predetermined value. This flame detection can be achieved by providing judgment device for judging whether or not the difference between the mean intensity of the signal as obtained by subtracting the electric signal converted by the first light reception device from the electric signal converted by the second light reception device in the line spectrum band and the mean intensity of the electric signal converted by the second light reception device, the mean intensity for the transmission band of the second filter, exceeds a predetermined value.

Lead selenide or a thermopile or pyroelectric-type light reception device can be used for the light reception devices of the first and second aspects. The existence/absence of the flame may be judged from the intensity of the line spectrum of resonance radiation of the carbonic acid gas obtained on the basis of the two electric signals obtained from the two filters, or may be judged from an AC component, caused by flicker of light of the flame, in the signal of the line spectrum of resonance radiation of the carbonic acid gas obtained by these two filters. Furthermore, flame detection can be done effectively when a dome-shaped diffusive transparent plate is used as a light reception window of the flame sensor.

In the first and second aspects described above, the predetermined value is preferably varied in accordance with the intensity of the electric signals outputted from the second light reception device. It is further preferred to increase the predetermined value with an increase of intensity of the electric signal outputted from the second light reception device.

A third aspect of the present invention is a flame sensor comprising: a narrowband filter which passes only light of a band corresponding to a line spectrum of carbonic acid gas resonance radiation generated by a flame; a broadband filter which passes light of a band broader than the band corresponding to the line spectrum; a first light reception device which converts light passing through the narrowband filter to an electric signal; a second light reception device which converts light passing through the broadband filter to an electric signal; and a preventing member for preventing generating a secondary radiation at the narrowband filter and the broadband filter, the preventing member being provided at a front side of the narrowband filter and the broadband filter.

A fourth aspect of the present invention is a flame sensor comprising: a first filter having a predetermined band for passing light, and having, within the predetermined band, a band blocking light of a band corresponding to a line spectrum of carbonic acid gas resonance radiation generated by a flame; a second filter having a band substantially the same as the predetermined band, passing light of a band inclusive of the band corresponding to the line spectrum, and having a band center different from a band center of the band corresponding to the line spectrum; a first light reception device which converts light passing through the first filter to an electric signal; a second light reception device which converts light passing through the second filter to an electric signal; and a preventing member for preventing generating a secondary radiation at the first filter and the second filter, the preventing member being provided at a front side of the first filter and the second filter.

In the third aspect of the present invention, the preventing member for preventing generating the secondary radiation at the narrowband filter and the broadband filter is provided at the front side of the narrowband filter and the broadband filter. In the fourth aspect of the present invention, the preventing member for preventing generating the secondary radiation at the first filter and the second filter is provided at the front side of the first filter and the second filter. Accordingly, in the light entering into the frame sensor, the light incidents to each filter after the light passes through the preventing member. Therefore, the second radiation due to sunlight entering the filter can be prevented.

In the third and fourth aspects of the present invention, the preventing member is preferably a silicon plate.

Moreover, in the third aspect, the circuit for calculating a mean intensity of the first light reception device, obtained such that a light energy passing through the narrowband filter is divided by bandwidth of the narrowband filter, and a mean intensity of the second light reception device obtained such that a light energy passing through the broadband filter is divided by bandwidth of the broadband filter, is preferably further provided. Also, in the fourth aspect, a circuit for calculating a mean intensity of the first light reception device, obtained such that a light energy passing through the first filter is divided by bandwidth of the first filter, and a mean intensity of the second light reception device obtained such that a light energy passing through the second filter is divided by bandwidth of the second filter, is preferably further provided.

DESCRIPTION OF THE PREFERRED EMBODIMENTS

A first embodiment of the present invention, which detects a flame by utilizing infrared rays having a wavelength of 4.4 microns emitted by the flame, will be explained initially.

Figure 1:
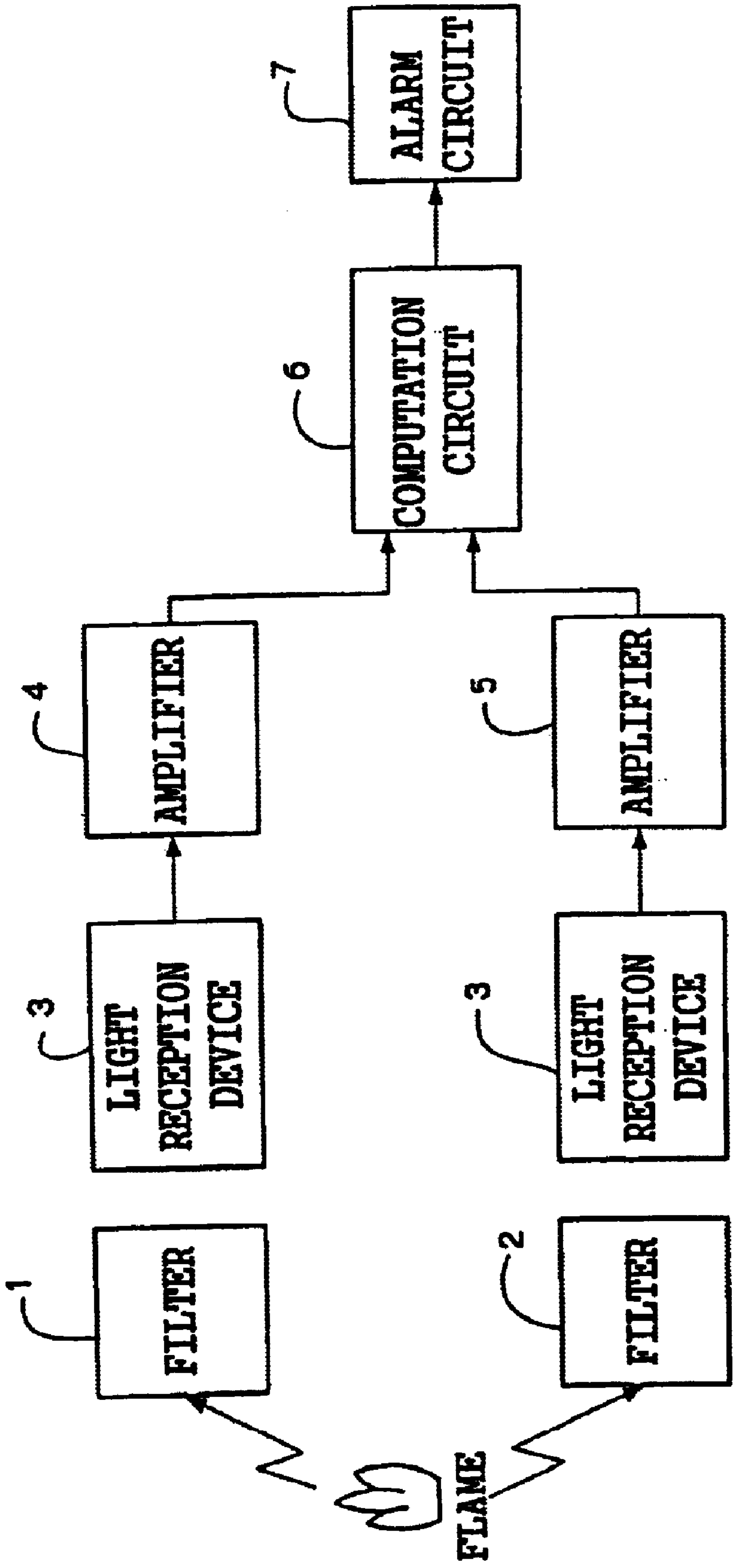
FIG. 1 is a conceptual structural view showing a first embodiment of the present invention.

Referring to FIG. 1, reference numeral 1 denotes a broadband filter whose band contains a spectral line of carbonic acid gas resonance radiation emitted from a flame, which allows transmission of rays of light of a broader band than the spectral line, and whose band center is disposed at a position spaced apart by a predetermined wavelength difference from the center of the spectral line. Reference numeral 2 denotes a narrow band filter that allows transmission of only rays of light of the spectral line of the carbonic acid gas resonance radiation emitted from the flame. Reference numeral 3 denote a light reception devices that receive the light transmitted through the broadband filter 1 and the narrow band filter 2 and converts the light to electric signals. Reference numerals 4 and 5 denote amplifiers that amplify the electric signals outputted from the light reception devices, respectively. Reference numeral 6 denotes a computation circuit that computes a difference of intensity of a spectrum transmitted through the broadband filter 1 and the amplifier 4 from intensity of a spectrum transmitted through the narrow band filter 2 and the amplifier 5. Reference numeral 7 denotes an alarm circuit that raises an alarm when output of the computation circuit 6 exceeds a predetermined value $\alpha$.

Figures 2A, 2B, 2C:
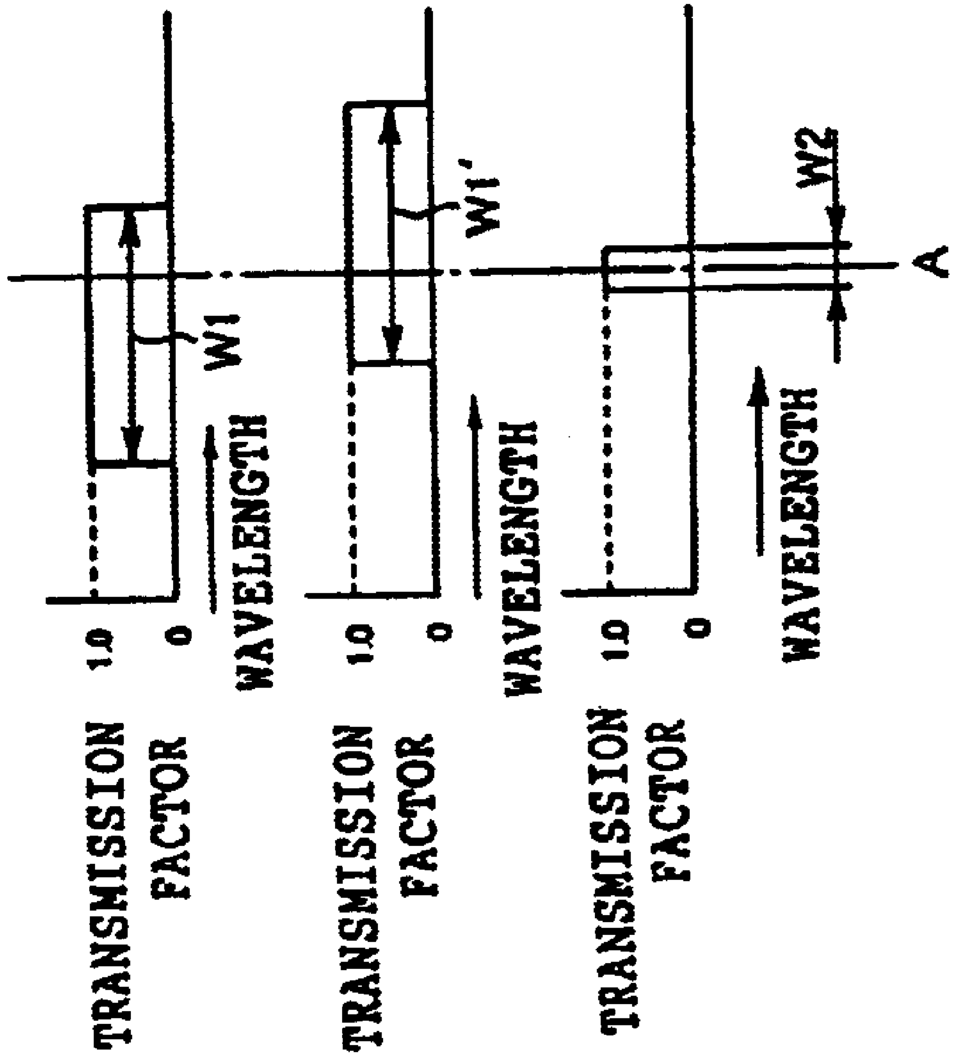
FIG. 2A is a diagram showing a characteristic of a filter used in the first embodiment of the present invention.
FIG. 2B is a diagram showing a characteristic of a filter used in the first embodiment of the present invention.
FIG. 2C is a diagram showing a characteristic of a filter used in the first embodiment of the present invention.

FIG. 2A shows a characteristic of the broadband filter 1 and FIG. 2B shows another characteristic of the broadband filter 1. FIG. 2C shows a characteristic of the narrow band filter 2. The abscissa represents wavelength and the ordinate represents a transmission factor. Numerical values 0 and 1.0 represent the transmission factors of 0% and 100%, respectively. Symbols W1 and W1' represent transmission bandwidth of the broadband filter 1 and W2 represents transmission bandwidth of the narrow band filter 2. Symbol A in FIGS. 2A, 2B and 2C represents the position of the spectral line of resonance radiation of the carbonic acid gas. The band center of the broadband filter 1 and that of the narrow band filter 2 are arranged so as not to coincide with each other. Since the band centers are not coincident, the production of the filters is easier than when they are coincident. The value A is 4.4 microns, for example, in the present embodiment. This embodiment uses a filter having the characteristic shown in FIG. 2A for the broadband filter 1 and a filter having the characteristic shown in FIG. 2C for the narrow band filter 2.

The embodiment shown in FIG. 1 will be explained in detail. The broadband filter 1 has a band W1 that includes a band W2 of the spectral line of carbonic gas resonance radiation emitted by a flame, with 4.4 microns as the wavelength of resonance radiation of the carbonic acid gas as the center, and the band W1 is broader than this band W2, as shown in FIG. 2.

The narrow band filter 2 has its band center at 4.4 microns and permits transmission of the band W2 containing the spectral line of the resonance radiation of the flame. This filter permits transmission, for example, only from 4.3 microns to 4.5 microns.

The band center of the broadband filter 1 is situated spaced apart by a predetermined wavelength difference from the wavelength 4.4 microns that is the band center of the narrowband filter 2. A ratio W1/W2 is selected so as to be at least 1.5, generally from 5 to 10. The predetermined wavelength is preferably set so as not to deviate from a sensitive range of the light reception device.

The light reception device 3 converts the infrared rays transmitted through the broadband filter 1 and the narrowband filter 2 to electric signals. One of the two electric signals so obtained is inputted to the computation circuit 6 through the amplifier 4 and the other to the computation circuit 6 through the amplifier 5.

The light reception device 3 preferably has a high sensitivity and a short response time in the wavelength band of infrared rays from 3 to 5 microns. A relatively economical light reception device suitable for this purpose is a thermopile or pyroelectric-type light reception device formed of lead selenide by a thin film formation technique.

The computation circuit 6 computes a difference $b1'-a1'=c1$ of mean intensity on the basis of the electric signal outputted from the amplifier 4 and the electric signal outputted from the amplifier 5. If the level of the electric signal outputted from the amplifier 4 is a1 and the level of the electric signal outputted from the amplifier 5 is b1, then the mean intensities a1' and b1' are defined by $a1'=a1/W1$ and $b1'=b1/W2$.

Incidentally, the mean intensities a1' and b1' may be determined by adjusting the amplification ratios of the amplifiers 4 and 5 or may be computed by the computation circuit 6.

There is a difference in the value of the mean intensity difference c1 between a continuous spectrum such as artificial light and the line spectrum of the flame for the following reason.

Figure 3:
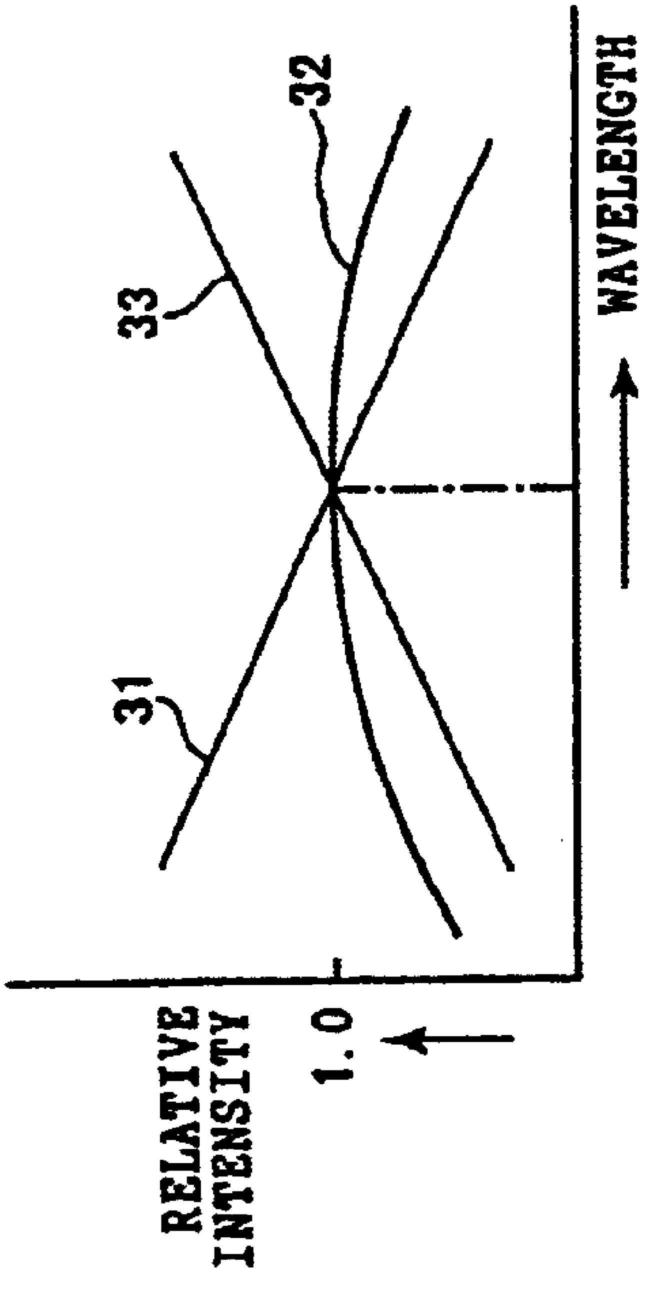
FIG. 3 is a diagram showing a typical example of spectra of radiation members emitting various continuous spectra.

FIG. 3 shows an example of a typical continuous spectrum having a wavelength round 4.4 microns. Reference numeral 31 in the drawing denotes a spectrum of illumination light such as a lamp, reference numeral 32 denotes a radiation spectrum of a black body around at 400° C. and reference numeral 33 denotes a spectrum of black body radiation at near 200° C. Each spectrum shown in FIG. 3 has a radiation intensity of 1 at 4.4 microns and intensities at other wavelengths are relative intensities based on the former.

As shown in FIG. 3, the radiation spectrum of the black body at around 400° C. has a peak at a wavelength around 4.4 microns. This spectrum is a continuous spectrum that drops away from 4.4 microns, with this value as the center, increases with wavelength (a positive tilt) for a lower temperature and decreases with wavelength (a negative tilt) for a higher temperature. The majority of light from the sun or a lamp light source describes a continuous spectrum having a negative tilt. In the case of such a continuous spectrum, the rate of change of relative intensity with wavelength, that is, the tilt, is not great. Therefore, the intensity of light (radiation) transmitted through the broadband filter 1 and the narrowband filter 2 is substantially proportional to the transmission bandwidth of each filter. In other words, the mean intensity $a1/W1$ is substantially equal to the mean intensity $b1/W2$. However, when the rate of change of relative intensity with wavelength is great, the difference of the mean intensity becomes greater, in accordance with the gap between the band centers of the filters, and, given that $\alpha$ is a predetermined value greater than 0, $c1>\alpha$.

Therefore, when the value $\alpha$ is optimized, it becomes possible to discriminate whether or not the spectrum is a continuous spectrum.

In contrast, when there is only light from a flame, the spectrum transmitting through both the broadband filter and the narrowband filter is mainly only the spectral line at 4.4 microns, because the spectrum of the flame originates the spectral line, and the quantity of energy transmitted through the broadband filter 1 is substantially equal to the quantity of energy transmitted through the narrowband filter 2. In consequence, the mean intensity obtained by dividing the energy of the spectral line transmitted through the broadband filter 1 by the total transmission bandwidth W1 is smaller than the intensity obtained by dividing the energy of the spectral line transmitted through the narrowband filter 2 by the total transmission bandwidth W2 of the narrow band, and a relation $b1'>a1'$ holds. The difference c1 between b1' and a1' is larger when the bandwidth of the broadband filter is great.

It can be appreciated from the above that the difference obtained by subtracting a1' from b1' is different for a continuous spectrum and the a line spectrum and, on the basis of this difference, ordinary external light having a continuous spectrum, such as solar light and artificial light, can be distinguished from the flame having the line spectrum.

Both when only the line spectrum is present and when the line spectrum and continuous spectrum are present together, the relation $c1>\alpha$ holds so long as the line spectrum of the flame is present. Therefore, when the computation circuit 6 or the alarm circuit 7 judges whether or not the relation $c1>\alpha$ exists, the flame can be detected, and the alarm circuit 7 raises an alarm when $c1>\alpha$.

When it is difficult to detect the flame through only the judgment of $c1>\alpha$, the predetermined value $\alpha$ as the threshold value for judging the flame may be changed in accordance with a magnitude $\beta$ of the output of the light reception device that detects the light transmitted through the broadband filter 1. When the magnitude $\beta$ becomes great, in the case of solar rays and illumination rays, the threshold value becomes great too Hence, an erroneous operation does not occur. When the line spectrum of the flame causes a large $\beta$, c1 is great relative to $\beta$ and the threshold value is great. Therefore, reporting failures do not occur.

When the predetermined value $\alpha$, the threshold value for flame detection, is changed inside the computation circuit 6 in accordance with the magnitude $\beta$ of the output of the light reception device for detecting the rays of light transmitting through the filter 1, it becomes possible to detect a flame causing a large $\beta$ and to prevent erroneous detection of solar and artificial light that can causes a large $\beta$.

Figure 4:
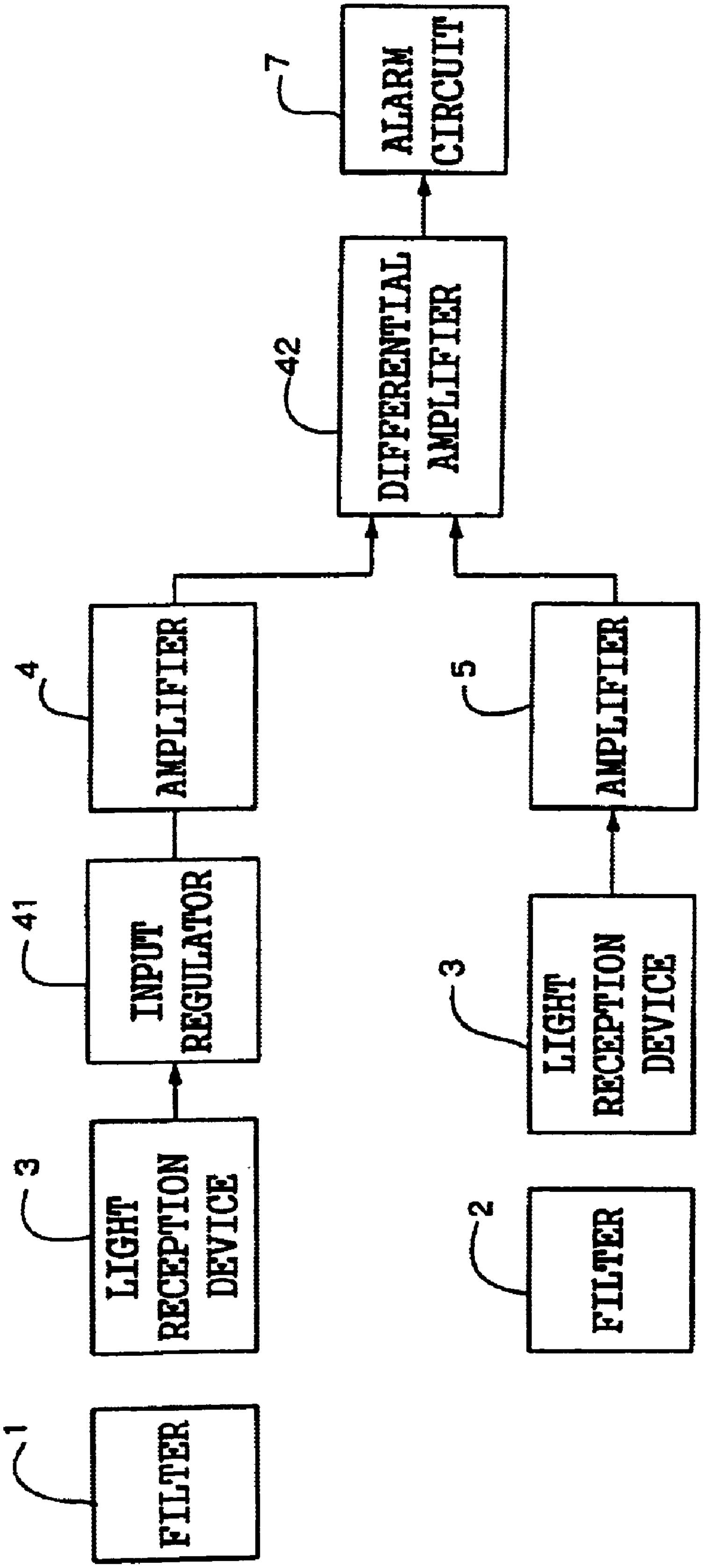
FIG. 4 is a block diagram of a second embodiment using an analog circuit.

FIG. 4 shows a flame sensor using an analog computation circuit according to a second embodiment. Referring to FIG. 4, reference numeral 41 denotes an input regulator connected to a pre-stage of the amplifier 4 and reference numeral 42 denotes a differential amplifier to which the outputs of the amplifiers 4 and 5 are inputted.

The broadband filter 1 and the narrowband filter 2 do not in practice have the ideal characteristic shown in FIG. 2. To regulate a difference of the characteristics, this embodiment uses the input regulator 41.

When rays of light of a continuous spectrum, such as rays of a lamp, are simultaneously inputted to the broadband filter 1 and to the narrowband filter 2, the output passing through the broadband filter 1, the light reception device 3, the input regulator 41 and the amplifier 4 is inputted to one of input terminals of the differential amplifier 42.

Meanwhile, the output passing through the narrowband filter 2, the light reception device 3 and the amplifier 5 is inputted to another input terminal of the differential amplifier 42. In this state, the differential amplifier 42 outputs a difference between the inputs at the two input terminals from an output terminal thereof. The input regulator 41 is operated such that this output reaches a predetermined value corresponding to the $\alpha$ explained above. This input regulator 41 plays the role that subtraction plays in the first embodiment.

As shown in FIG. 3, the tilt of relative intensity with wavelength is not great in the case of the continuous spectrum. Therefore, the input regulator 41 is regulated in accordance with the artificial light transmits the continuous spectrum having the greatest tilt of relative intensity, such that the output of the differential amplifier 42 reaches the predetermined value. Consequently, the output of the differential amplifier 42 is below the predetermined value for all other continuous spectra. In other words, the output is below the predetermined value for all the types of spectra 31, 32 and 33 shown in FIG. 3.

As explained above, the flame sensor according to this embodiment has low sensitivity to rays of light of the continuous spectra and does not generate erroneous responses to solar rays and artificial rays.

The rays of light of a flame generate a greater difference between the outputs of the amplifiers 4 and 5 than in the case of the continuous spectrum, as explained with reference to FIG. 1. Therefore, the differential amplifier 42 detects whether or not this difference exceeds a predetermined value and the alarm circuit 7 raises the alarm. In this way, the existence of the flame can be detected.

In this embodiment too, the predetermined value as the threshold value for flame detection may be varied in accordance with the magnitude β of the output of the light reception device for detecting the rays of light transmitted through the filter 1 in the same way as in the first embodiment. In this case, a flame causing a large β can be judged as a flame, and erroneous reports are not generated in cases of solar rays and illumination rays causing a large β. Incidentally, the structure of changing the threshold value of flame detection in accordance with the magnitude β of the output of the light reception device can be applied also to the following embodiments.

Next, a third embodiment using a digital computation circuit will be explained.

Figure 5:
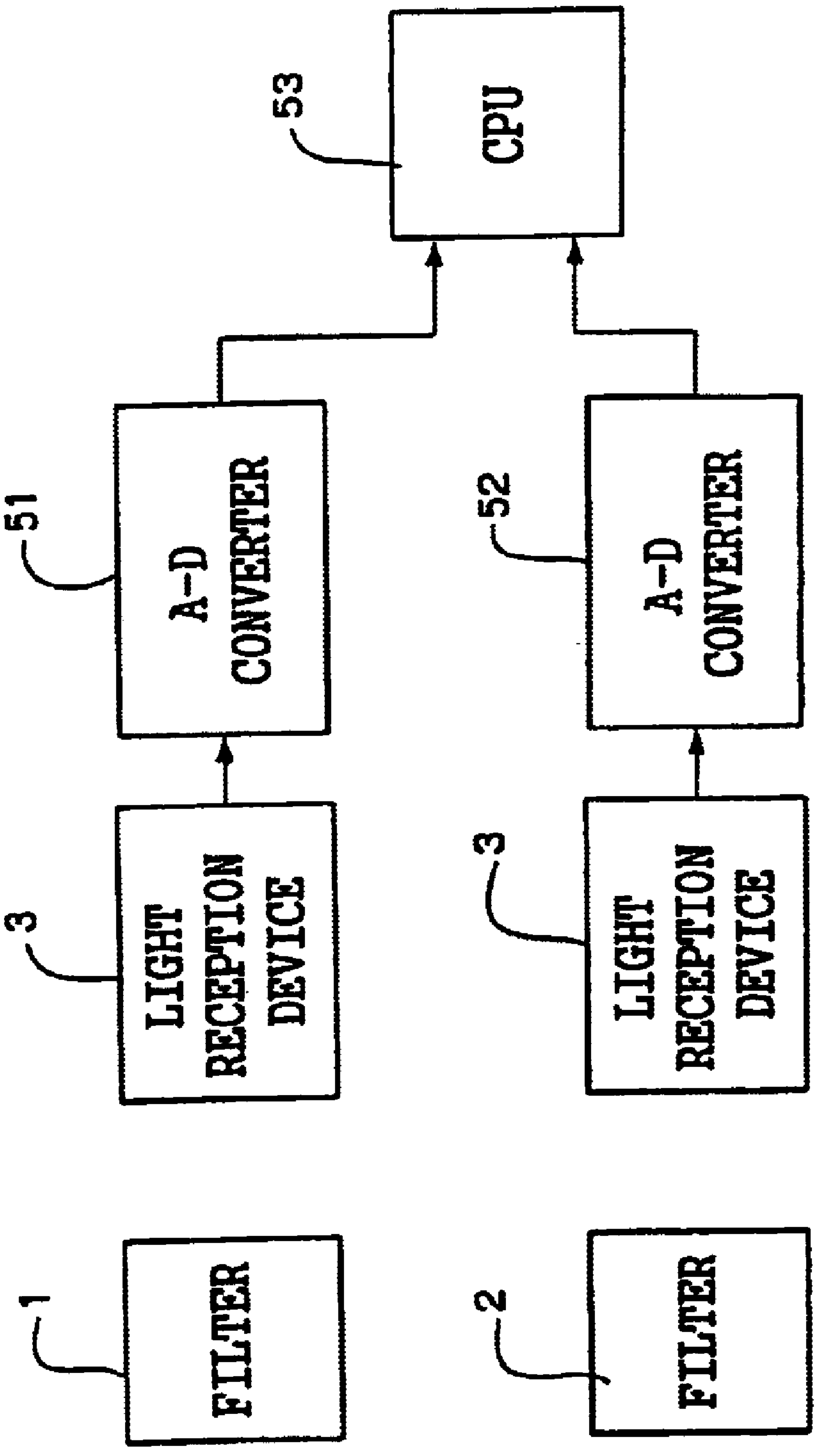
FIG. 5 is a block diagram showing a third embodiment using a digital circuit.

Referring to FIG. 5, reference numerals 51 and 52 denote A-D converters for converting analog signals to digital signal. Reference numeral 53 denotes a CPU. Here, the A-D converters 51 and 52 may be disposed outside the CPU 53 as shown in FIG. 53 or may be contained inside the CPU 53. Software inside the CPU 53 detects the flame. An outline of this software is as follows.

First, the rays of light of the continuous spectrum are simultaneously irradiated to the broadband filter 1 and to the narrowband filter 2. The output of the A-D converter 51 at this time is a, and that of the A-D converter 52 is b.

A weight is applied to either of these a and b to establish the following formula. In this case, a predetermined number may be applied as the weight to either a or b. This weight k is selected so as to satisfy the equation $b-ka=c$. The weight k is a particular value determined primarily by the characteristics of the broadband filter 1, the characteristics of the narrowband filter 2 and the characteristics of the light reception devices 3 of the sensor. When these characteristics have been determined, the k value is unique to the sensor and is rarely changed by environmental conditions or the like.

Hence, the flame sensor can enter an alarm standby state. The formula $b-ka=c$ is computed from the output values a and b of the A-D converters 51 and 52 when the flame sensor enters the alarm standby state.

When $c \leqq \gamma$ (where γ is a threshold value and can be expressed by W2α using W2 and α of the first embodiment), the rays of light incident to the flame sensor are a continuous spectrum. When the spectral line emitted from the flame is present, $c>\gamma$ whether or not rays of light of a continuous spectrum, such as solar rays, are also present.

Therefore, in the flame sensor using the CPU 53, the program of the CPU 53 may be set such that the value c is always computed and an alarm of occurrence of a flame is outputted when the value c exceeds the predetermined value γ. In this way, a flame sensor using a digital circuit and almost free from erroneous reports can be obtained.

The flame sensor of the embodiment described above does not utilize flicker having a relatively low frequency that is emitted from a flame. A flame sensor having higher sensitivity can be archived if this flicker is detected, in the form of flicker of the line spectrum emitted from the carbonic acid gas, to detect the existence of the flame.

Figure 6:
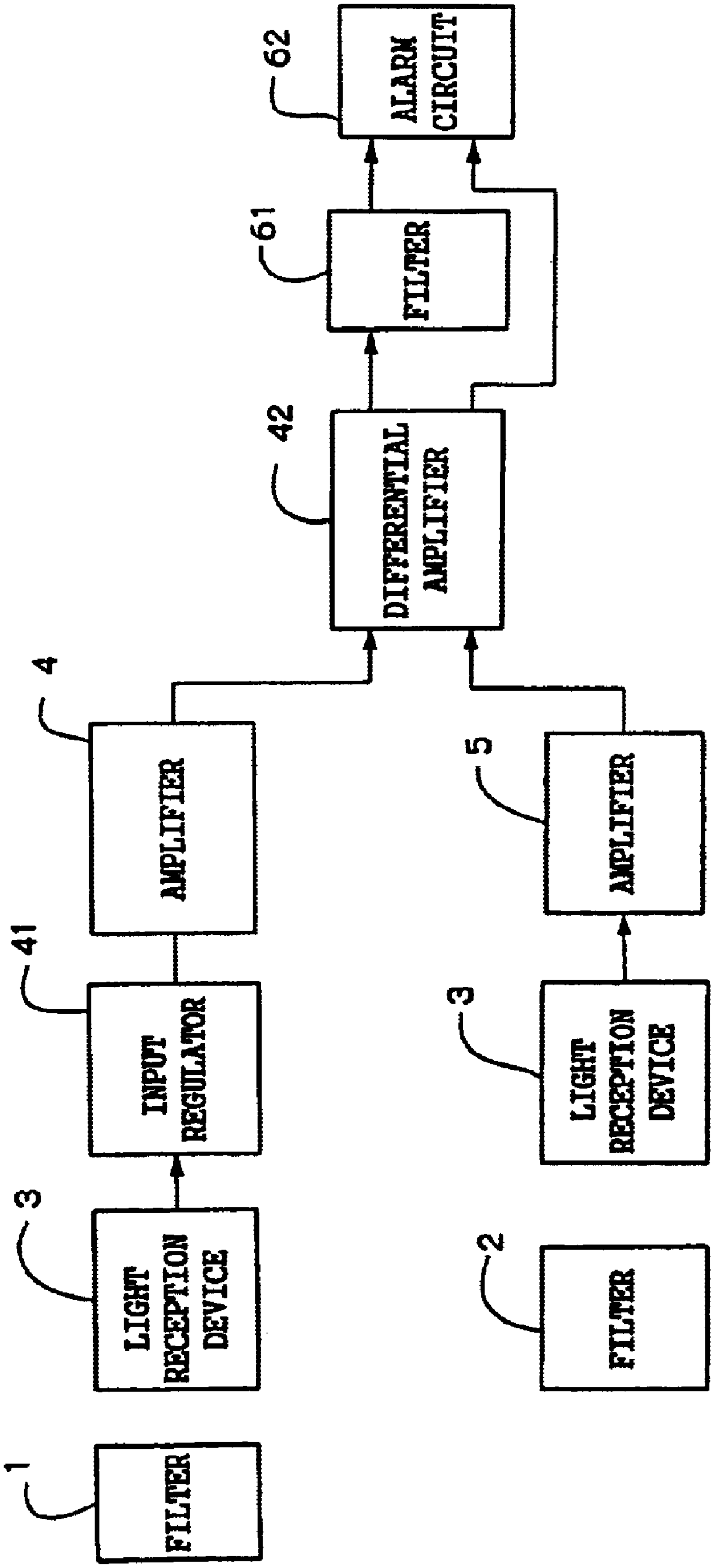
FIG. 6 is a block diagram showing a fourth embodiment using an analog circuit.

FIG. 6 shows an analog type flame sensor utilizing flicker according to a fourth embodiment based on the flame sensor shown in FIG. 4. Reference numeral 61 in FIG. 6 denotes an electrical filter. Reference numeral 62 denotes an alarm circuit for raising an alarm. The filter 61 is an analog type low-pass filter that permits mainly the passage of signals with frequencies below 20 Hz, which are contained in flames.

The outputs from the differential amplifier 42 contain both a DC component and an AC component, which are components of the light of the flickering flame. The DC component is the mean size of the flame, and the AC component is generated by the flicker of the flame.

The filter 61 permits the passage of only the AC component based on the flicker, and output of the filter is inputted to the alarm circuit 62. On the other hand, an output from the differential amplifier 42 that contains both AC and DC components is directly inputted to the alarm circuit 62.

The alarm circuit 62 includes two circuits. One of them (hereinafter called an “OR” circuit) measures the level of signal of the flicker component inputted from the filter 61, and the signal levels of the both DC and AC components that are directly inputted from the differential amplifier 42 without passing through the filter 61 and that represent the size of the flame, and generates an alarm when either of the signal levels exceeds a predetermined level. The other (hereinafter called an “AND circuit”) generates an alarm when both exceed the predetermined level. These circuits can be used selectively as appropriate.

It is preferred to use the OR circuit, which has high sensitivity, in places where external light is scarce, such as for flame detection inside a warehouse, and the AND circuit, which has a reduced possibility of erroneous detection in places where a large quantity of external light exists, such as inside offices or outdoors where there is sunlight.

Figure 7:
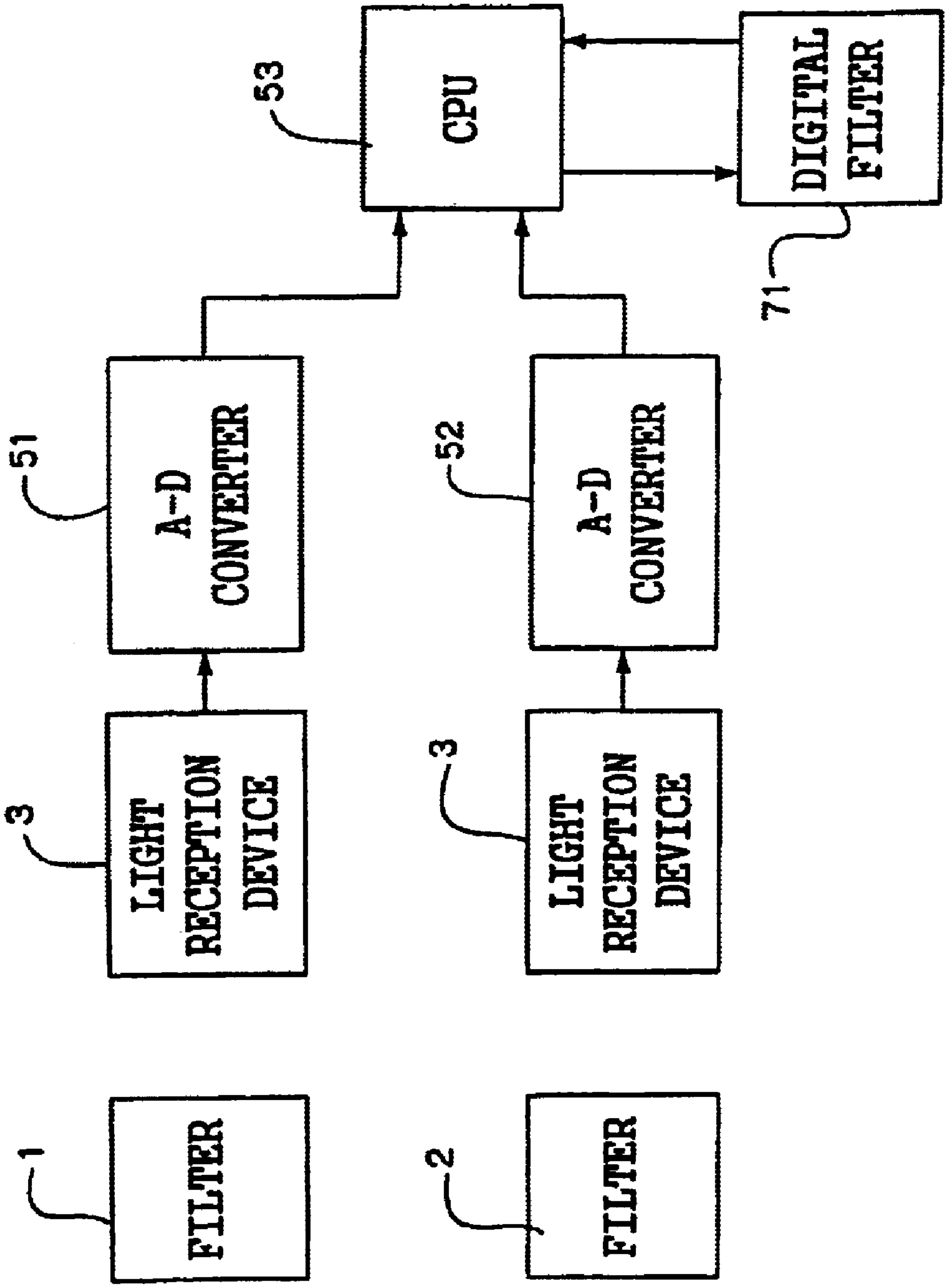
FIG. 7 is a block diagram showing a fifth embodiment using a digital circuit.

FIG. 7 shows a flame sensor according to a fifth embodiment of the present invention, which utilizes flicker with the third embodiment. Referring to FIG. 7, reference numeral 71 denotes a digital filter. The digital filter 71 operates in the same way as the filter 61 shown in FIG. 6. This filter 71 may be disposed outside the CPU 53 as shown in FIG. 7 or may be incorporated as software inside the CPU 53. The digital filter 71 detects whether or not the component peculiar to a flicker of the light of a flame is contained in the difference c computed inside the CPU 53 which has been explained with reference to FIG. 5.

The CPU 53 contains both the OR circuit and the AND circuit, to which the value of the AC component due to flicker of a flame is inputted after digital computation and to which the value containing both the DC component representing the size of the flame and the AC component due to the flicker are inputted, and both circuits are selectively used as appropriate. The proper use of both circuits is the same as in the sixth embodiment shown in FIG. 6.

Figure 8:
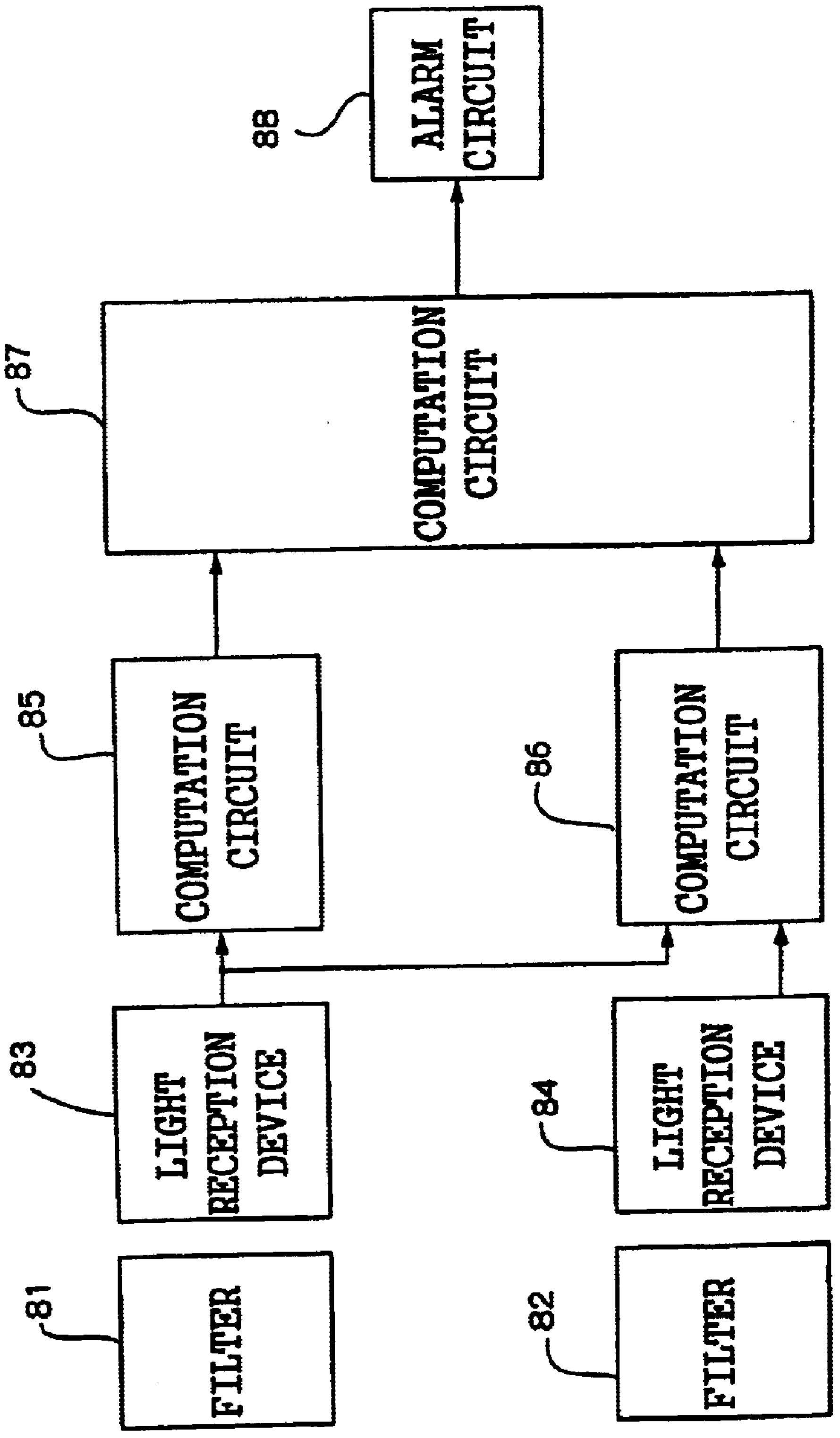
FIG. 8 is a block diagram showing a sixth embodiment using flicker.

FIG. 8 is a schematic structural view of a sixth embodiment of the present invention. Reference numeral 81 in FIG. 8 donates a band-pass filter that allows all frequencies within a band to pass equally and reference numeral 82 denotes filter that blocks only resonance radiation of the carbonic acid gas. Reference numerals 83 and 84 denote light reception devices. Reference numeral 85 denotes a circuit for computing a mean intensity of the spectrum transmitted through the filter 81. Reference numeral 86 denotes a computation circuit for computing a difference between the spectrum transmitted through the filter 81 and the spectrum transmitted through the filter 82. Reference numeral 87 denotes a circuit for computing a difference between the outputs of the computation circuits 85 and 86. Reference numeral 88 denotes an alarm circuit for raising an alarm when the output of the computation circuit 87 exceeds a predetermined level.

Figures 9A, 9B, 9C:
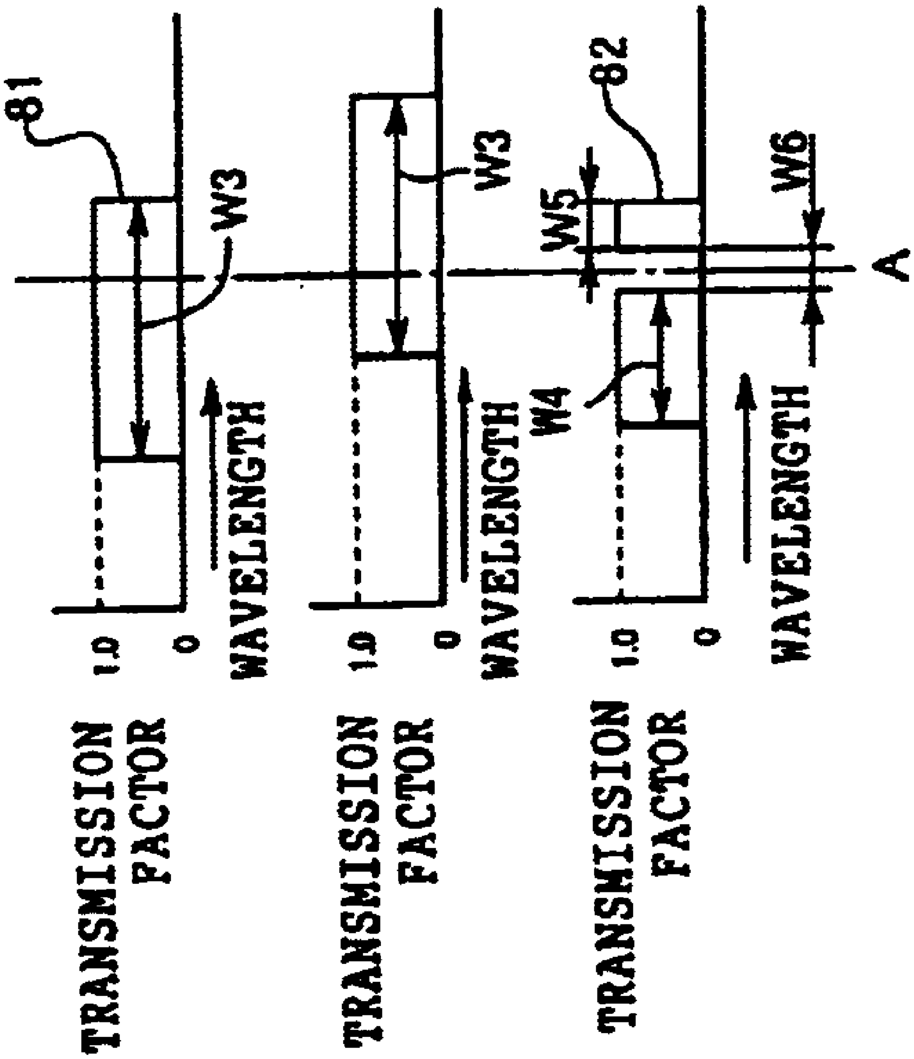
FIG. 9A is a diagram showing a characteristic of filter used in the sixth embodiment.
FIG. 9B is a diagram showing a characteristic of filter used in the sixth embodiment.
FIG. 9C is a diagram showing a characteristic of filter used in the sixth embodiment.

FIGS. 9A to 9C show transmission bandwidths of the filters 81 and 82. FIGS. 9A and 9B show transmission bands of the filter 81 and FIG.9C shows a transmission band of the filter 82. In FIGS. 9A and 9B, reference numeral W3 denotes the transmission bandwidth of the filter 81 and W4 and W5 denote transmission bandwidths of the filter 82. W6 denotes a transmission stop bandwidth sandwiched between the two transmission bandwidths W4 and W5. Either of the bandwidths shown in FIGS. 9A and 9B may be used for the transmission band of the filter 81. Each band satisfies the relation W3=W4+W5+W6.

Symbol A represents the position of the spectral line of resonance radiation of the carbonic acid gas. The band center of the filter 81 is spaced apart by a predetermined wavelength difference from that of the filter 82. Since the band centers are thus spaced apart from each other by the predetermined wavelength difference, fabrication of the flame sensor is easier than if the band centers were coincident. Rays of light transmitted through the filters 81 and 82 are inputted to the light reception devices 83 and 84, respectively, and are converted to electric signals. Output from the light reception device 83 is divided by the transmission bandwidth W3 of the filter 81 inside the computation circuit and this mean intensity is outputted from the computation circuit 85.

On the other hand, the outputs of the two light reception devices 83 and 84 are inputted to the computation circuit 86 for calculating their difference, such as, for example, a circuit comprising a differential amplifier. Energy including the band of resonance radiation of the carbonic acid gas is inputted to the light reception device 83, and energy excluding the band of the resonance radiation of the carbonic acid gas is inputted to the light reception device 84. Therefore, the computation circuit 86 outputs a computation result that is the sum of energy of the band W6 shown in FIG. 9 as the band of resonance radiation of the carbonic acid gas, with an error corresponding to the deviation of the band centers and an error corresponding to the shape of an intensity distribution of the spectrum of rays of light transmitted through the filters. When radiation inside the transmission band W3 of the filter 81 is a continuous spectrum, such as when the radiation body is an incandescent lamp, the mean intensity obtained by dividing this output by the band W6 and calculated by the computation circuit 85 gives a predetermined error due to the errors described above.

Therefore, the output of the circuit 87, which computes the difference between the outputs of the computation circuits 85 and 86, is a predetermined value when the input is a continuous spectrum. However, when the spectrum in the infrared region is almost fully occupied by resonance radiation of the carbonic acid gas, such as in the case of rays of light from a flame, the output of the computation circuit 87 becomes greater.

The output from the filter 81 becomes only the line spectrum of resonance radiation, and the computation circuit 85 outputs the mean intensity obtained by dividing the intensity of the line spectrum by the bandwidth W3. Therefore, given that the bandwidth W3 of the filter 81 is broader than the bandwidth W6 corresponding to resonance radiation of the carbonic acid gas, the intensity of resonance radiation of the carbonic acid gas outputted from the computation circuit 85 is outputted as a value that is decreased to an extent corresponding to the width of the band.

On the other hand, the output of the computation circuit 86 is the difference between the outputs of the filters 81 and 82, that is, the component of resonance radiation of the carbonic acid gas, inclusive of the error.

Therefore, a difference develops between the output of the computation circuit 85 and the output of the computation circuit 86. This difference is computed by the computation circuit 87 and is outputted. The greater the flame and the greater the value W3/W6, the greater this output value is.

In the manner described above, the external rays of light having the continuous spectrum and the rays of light of the flame having the line spectrum are distinguished from one another. For the same reason, only the value of the line spectrum containing the error is outputted from the computation circuit 87 when a both continuous spectrum and a line spectrum are mixed.

The alarm circuit 88 starts operating and raises an alarm when the output of the computation circuit 87 exceeds a predetermined value.

When it is difficult to realize the characteristics of the filter 82 with one filter, a band-pass filter having a transmission band W4 and a filter having a band W5 as shown in FIG. 9C are used and their outputs are added using an addition circuit. In this way, a filter having the characteristics of the filter 82 can be achieved.

Figure 10:
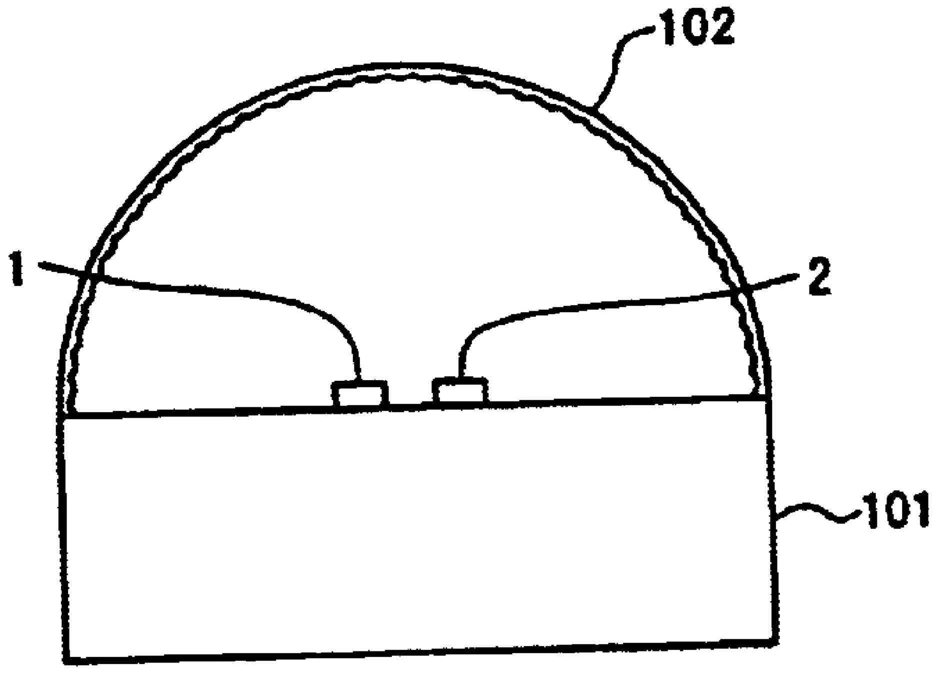
FIG. 10 is a schematic view showing a dome-like window.
Figure 11A:
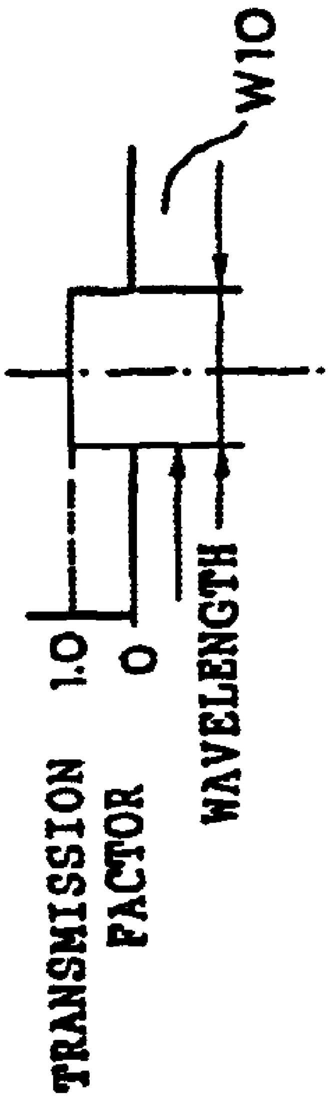
PRIOR ART FIG. 11A
FIG. 11A is a diagram showing a characteristic of a filter used in the prior art.
Figure 11B:
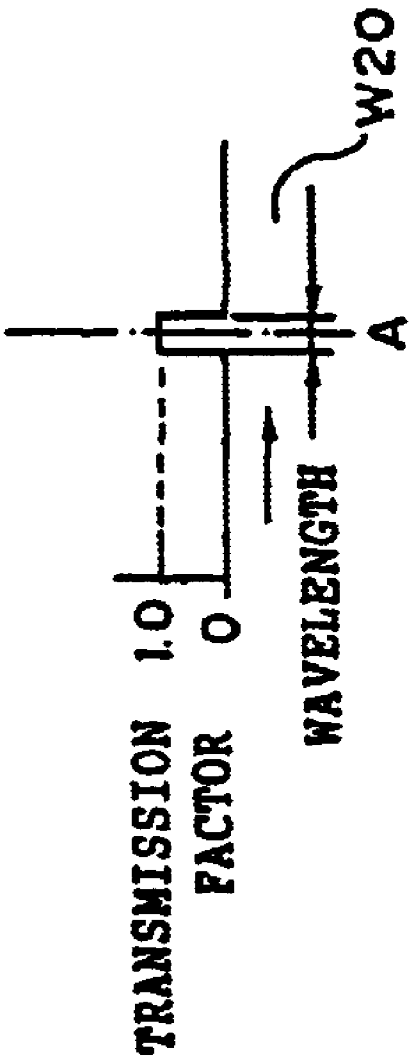
FIG. 11B is a diagram showing a characteristic of a filter used in the prior art.

FIG. 10 illustrates a dome-like window that is disposed above a light reception surface of the flame sensor. In FIG. 10, reference numeral 101 denotes a sensor main body. Reference numerals 1 and 2 denote filters. Reference numeral 102 is a transparent dome whose surface or back is coarsened.

The filters 1 and 2 are generally planar, and sensitivities thereof has directivity characteristics similar to those of a spherical shape. Therefore, the sensitivity of the flame sensor is likely to change depending on the position of occurrence of a flame, and a sensitivity difference is likely to appear due to the difference of the relative positions of the filters 1 and 2 and the flame occurring position. The dome-like window, which has an irregular reflecting property, is provided to eliminate these problems.

This window is appropriately formed of a plastic material that well transmits intermediate infrared rays. Ordinary glass is not preferable because its transmission factor for intermediate infrared rays is not high. A large number of bmps and hollows are formed on the surface or back of the dome to impart the irregular reflection property. Due to the irregular reflection property of the dome-like window, error resulting from differences of directions of arriving rays of light incident to the sensor main body 101 can be mitigated. The same can be used likewise when the filters 81 and 82 are used, too.

If the filters described in above embodiments are exposed to sunlight, particularly if the flame sensor is installed in an environment where it is exposed to strong sunlight over long periods, the filters are heated by sunlight and secondary radiation is generated from the filters. The secondary radiation is likely to affect the accuracy of flame detection due to the secondary radiation entering the light reception devices. Accordingly, in order to provide a flame sensor that can more accurately detect a flame. The secondary radiation due to sunlight may be taken into consideration.

Figure 12:
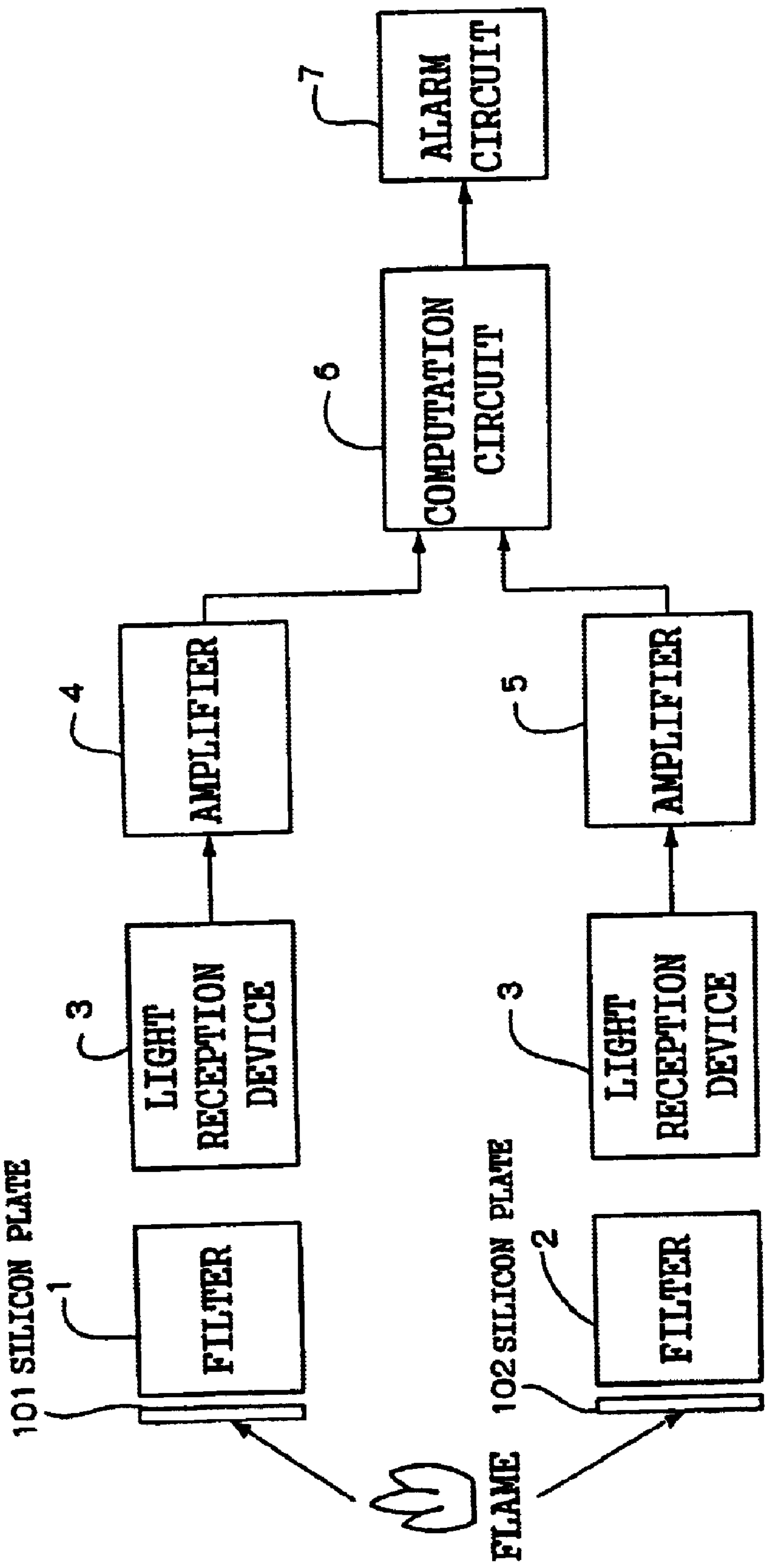
FIG. 12 is a block diagram showing a seventh embodiment.

A seventh embodiment of the present invention will be explained referring to FIG. 12. Reference numeral 1 denotes a broadband filter whose band contains a spectral line of carbonic acid gas resonance radiation emitted from a flame, which allows transmission of rays of light of a broader band than the spectral line. Reference numeral 2 denotes a narrow band filter that allows transmission of only rays of light of the spectral line of the carbonic acid gas resonance radiation emitted from the flame. Reference numeral 3 denote a light reception devices that receive the light transmitted through the broadband filter 1 and the narrow band filter 2 and converts the light to electric signals. Reference numerals 4 and 5 denote amplifiers that amplify the electric signals outputted from the light reception devices, respectively. Reference numeral 6 denotes a computation circuit that computes a difference between intensity of a spectrum transmitted through the broadband filter 1 and the amplifier 4 and intensity of a spectrum transmitted through the narrow band filter 2 and the amplifier 5. Reference numeral 7 denotes an alarm circuit that raises an alarm when output of the computation circuit 6 exceeds a predetermined value $\alpha$. Reference numerals 101 and 102 denote silicon plates, each of which is disposed at a front side of the respective filters (namely, the silicon plate 101 is disposed opposite side of the light reception device 3 with respect to the filter 1, and the silicon plate 102 is disposed opposite side of the light reception device 3 with respect to the filter 2) and which block light of wavelengths shorter than about 1 micron. The silicon plates 101 and 102 of the present embodiment are formed by silicon with the thickness of about 1 mm. These silicon plates cut light having a wavelength shorter than about 1 micron. Hence, the filters 1 and 2 only receive light of wavelength greater than 1 micron, and this restrains the temperature of the filters from increasing. Thus, secondary radiation on the filters 1 and 2 can be prevented.

In the present embodiment, the same effects of the first embodiment are obtained. Moreover, because the silicon plates 101 and 102 are disposed in front of the filters 1 and 2, only light that is transmitted by the silicon plates 101 and 102 is incident on the filters 1 and 2. Thus, secondary radiation on the filters 1 and 2 can be prevented.

In the present invention, the narrowband filter which passes only light of a band corresponding to a line spectrum of carbonic acid gas resonance radiation generated by a flame, and the broadband filter which passes light of a band broader than the band corresponding to the line spectrum and which has a band center different from a band center of the band corresponding to the line spectrum may be used, or the narrowband filter which passes only light of the band corresponding to the line spectrum of carbonic acid gas resonance radiation generated by the flame, and the broadband filter which passes light of the band broader than the band corresponding to the line spectrum and which has a band center same as a band center of the band corresponding to the line spectrum, may be used.

Further, in the present embodiment, the silicon plates 101 and 102 are disposed at the front side of the respective filters 1 and 2, however, single silicon plate may be disposed at the front side of the filters 1 and 2.

Further, in the present embodiment, the silicon plates 101 and 102 are used, however, any members which can prevent generating secondary radiation on filter may be used. For example, a germanium may be used substituting for the silicon.

Further, in the present embodiment, it is possible that a reflection preventing member which prevents light from reflecting on the silicon plate is provided. In this case, it is preferable that an antireflection coating (film) is deposited on the silicon plate.

According to the present invention, the band centers of the two filters are set to wavelengths spaced apart from each other as described above. Therefore, the present invention provides a flame sensor that can be easily produced and can accurately detect a flame.

Also, according to the present invention, by the simple structure in which the preventing members for preventing secondary radiation are disposed in front of the filters, thus, secondary radiation on the filters can be prevented. Therefore, the present invention provides a flame sensor that can be easily produced and can accurately detect a flame.

What is claimed is:

1. A flame sensor comprising:

a narrowband filter which passes only light of a band corresponding to a line spectrum of carbonic acid gas resonance radiation generated by a flame;

a broadband filter which passes light of a band broader than the band corresponding to the line spectrum, and which has a band center different from a band center of the band corresponding to the line spectrum;

a first light reception device which converts light passing through the narrowband filter to an electric signal; and a second light reception device which converts light passing through the broadband filter to an electric signal.

2. A flame sensor according to claim 1, further comprising:

a judgment device which judges whether or not a difference between a mean intensity of the electric signal of the first light reception device, which is calculated based on bandwidth of the narrowband filter, and a mean intensity of the electric signal of the second light reception device, which is calculated based on bandwidth of the broadband filter, equals to or exceeds a predetermined value.

3. A flame sensor according to claim 2, wherein the difference between the mean intensities is determined by a differential amplifier.

4. A flame sensor according to claim 2, wherein the difference between the mean intensities is calculated by a digital circuit including a CPU.

5. A flame sensor according to claim 2, wherein the predetermined value is varied in accordance with an intensity of the electric signal of the second light reception device.

6. A flame sensor according to claim 1, wherein each of the light reception devices uses one of lead selenide, a thermopile and a pyroelectric-type light reception device.

7. A flame sensor according to claim 1, wherein the presence of a flame can be detected based on an alternating component due to flicker of light from the flame being included in a signal corresponding to the line spectrum of the carbonic acid gas resonance radiation, said signal being obtained on the basis of the two electric signals obtained from said first and second filters.

8. A flame sensor according to claim 1, wherein a dome-shaped diffusive transparent plate is used as a light reception window of the flame sensor.

9. A flame sensor according to claim 1, further comprising:

a preventing member for preventing generating a secondary radiation at the narrowband filter and the broadband filter, the preventing member being provided at a front side of the narrowband filter and the broadband filter.

10. A flame sensor according to claim 9, wherein the preventing member is a silicon plate.

11. A flame sensor comprising:

a first filter having a predetermined band for passing light, and having, within the predetermined band, a band blocking light of a band corresponding to a line spectrum of carbonic acid gas resonance radiation generated by a flame;

a second filter having a band substantially the same as the predetermined band, passing light of a band inclusive of the band corresponding to the line spectrum, and having a band center different from a band center of the band corresponding to the line spectrum;

a first light reception device which converts light passing through the first filter to an electric signal; and a second light reception device which converts light passing through the second filter to an electric signal.

12. A flame sensor according to claim 11, further comprising:

a judgment device which judges whether or not a difference between a mean intensity of a signal obtained by subtracting the electric signal of the first light reception device from the electric signal of the second light reception device, which is calculated based on bandwidth corresponding to the line spectrum, and a mean intensity of the electric signal of the second light reception device, which is calculated based on bandwidth of the second filter, equals to or exceeds a predetermined value.

13. A flame sensor according to claim 12, wherein the difference between the mean intensities is determined by a differential amplifier.

14. A flame sensor according to claim 12, wherein the difference between the mean intensities is calculated by a digital circuit including a CPU.

15. A flame sensor according to claim 11, wherein each of the light reception devices uses one of lead selenide, a thermopile and a pyroelectric-type light reception device.

16. A flame sensor according to claim 11, wherein the presence of a flame can be detected based on an alternating component due to flicker of light from the flame being included in a signal corresponding to the line spectrum of the carbonic acid gas resonance radiation, said signal being obtained on the basis of the two electric signals obtained from said first and second filters.

17. A flame sensor according to claim 11, wherein a dome-shaped diffusive transparent plate is used as a light reception window of the flame sensor.

18. A flame sensor according to claim 11, further comprising:

a preventing member for preventing generating a secondary radiation at the first filter and the second filter, the preventing member being provided at a front side of the first filter and the second filter.

19. A flame sensor comprising:

a first filter having a predetermined band for passing light, and having, within the predetermined band, a band blocking light of a band corresponding to a line spectrum of carbonic acid gas resonance radiation generated by a flame;

a second filter having a band substantially the same as the predetermined band, passing light of a band inclusive of the band corresponding to the line spectrum, and having a band center different from a band center of the band corresponding to the line spectrum;

a first light reception device which converts light passing through the first filter to an electric signal;

a second light reception device which converts light passing through the second filter to an electric signal; and a preventing member for preventing generating a secondary radiation at the first filter and the second filter, the preventing member being provided at a front side of the first filter and the second filter.

20. A flame sensor according to claim 19, wherein the preventing member is a silicon plate.

21. A flame sensor according to claim 19, further comprising:

a circuit for calculating a mean intensity of the first light reception device, obtained such that a light energy passing through the first filter is divided by bandwidth of the first filter, and a mean intensity of the second light reception device obtained such that a light energy passing through the second filter is divided by bandwidth of the second filter.

* * * * *